(12) United States Patent
Fan et al.

(10) Patent No.: US 11,255,781 B2
(45) Date of Patent: Feb. 22, 2022

(54) VISIBILITY METER, STREET LIGHT DEVICE AND OPERATION METHOD THEREOF

(71) Applicants: LITE-ON ELECTRONICS (GUANGZHOU) LIMITED, Guangzhou (CN); Lite-On Technology Corporation, Taipei (TW)

(72) Inventors: Li-Ta Fan, Taipei (TW); Kuei-Ling Chen, Taipei (TW); Tsan-Li Chiu, Taipei (TW); Kuo-Hui Chang, Taipei (TW); Yao-Chi Peng, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/878,613

(22) Filed: May 20, 2020

(65) Prior Publication Data

US 2020/0371024 A1    Nov. 26, 2020

Related U.S. Application Data

(60) Provisional application No. 62/850,497, filed on May 20, 2019.

(30) Foreign Application Priority Data

Oct. 18, 2019  (CN) .......................... 201910991799.8

(51) Int. Cl.
*G01N 21/53*   (2006.01)
*G01N 21/59*   (2006.01)

(52) U.S. Cl.
CPC ........... *G01N 21/538* (2013.01); *G01N 21/59* (2013.01)

(58) Field of Classification Search
CPC .............. B60R 21/0134; B60R 21/013; G01N 21/59; G01N 21/538; G01N 15/0211;
(Continued)

(56) References Cited

U.S. PATENT DOCUMENTS 3,901,812 A * 8/1975 Hallengren .......... G01N 21/538
250/565
6,498,647 B1 * 12/2002 Kuehnle .............. G01N 21/538
356/437

(Continued)

FOREIGN PATENT DOCUMENTS

| CN | 2630844 | 8/2004 |
|---|---|---|
| CN | 1651904 | 8/2005 |

(Continued)

OTHER PUBLICATIONS

"Office Action of Taiwan Counterpart Application", dated Dec. 10, 2016, p. 1-p. 8.
(Continued)

*Primary Examiner* — Hoa Q Pham
(74) *Attorney, Agent, or Firm* — JCIPRNET

(57) ABSTRACT

A visibility meter, a street light device and an operation method thereof are provided. The visibility measurement method includes: transmitting a visible laser through an optical transmitter; receiving the visible laser through an optical sensor to generate a sensed result; and calculating a visibility according to the sensed result.

13 Claims, 12 Drawing Sheets

(58) Field of Classification Search
CPC .............. G08G 5/0091; G08G 5/0013; G08G 5/0008; B64D 43/00
USPC .................. 356/335–343, 4.01, 73, 5.05; 250/573–575; 340/601, 435, 557, 602, 340/963, 945; 701/301, 120, 51, 9; 702/3

See application file for complete search history.

(56) References Cited

U.S. PATENT DOCUMENTS

| | | | |
|---|---|---|---|
| 8,890,463 B2 | 11/2014 | Rozman et al. | |
| 9,002,660 B2* | 4/2015 | Mannstein | B64D 45/00 702/30 |
| 9,900,960 B1* | 2/2018 | Lin | H05B 45/20 |
| 2008/0165031 A1* | 7/2008 | Estrada | G01S 17/95 340/963 |
| 2010/0161255 A1* | 6/2010 | Mian | G01N 29/041 702/56 |
| 2014/0028219 A1* | 1/2014 | Chen | H05B 45/12 315/297 |
| 2019/0098729 A1* | 3/2019 | Broers | H05B 47/155 |
| 2019/0268994 A1* | 8/2019 | Paolini | H05B 45/20 |

FOREIGN PATENT DOCUMENTS

| | | |
|---|---|---|
| CN | 102183442 | 1/2013 |
| CN | 104039058 | 12/2016 |
| CN | 106332345 | 1/2017 |
| TW | I496705 | 8/2015 |
| TW | I542212 | 7/2016 |
| WO | 2010047564 | 4/2010 |

OTHER PUBLICATIONS

"Office Action of Taiwan Counterpart Application", dated Jul. 26, 2021, pp. 1-9.

* cited by examiner

VISIBILITY METER, STREET LIGHT DEVICE AND OPERATION METHOD THEREOF

CROSS-REFERENCE TO RELATED APPLICATION

This application claims the priority benefit of U.S. provisional application Ser. No. 62/850,497, filed on May 20, 2019, and China application serial no. 201910991799.8, filed on Oct. 18, 2019. The entirety of each of the above-mentioned patent applications is hereby incorporated by reference herein and made a part of this specification.

BACKGROUND OF THE INVENTION

1. Field of the Invention

The invention relates to a visibility meter, a street light device and an operation method thereof.

2. Description of Related Art

A visibility is a measure capable of clearly distinguishing a distance of an object or light. A traditional transmissometer uses an electromagnetic wave with a wavelength of about 550 nm to measure the visibility. The transmissometer has an optical transmitter and an optical sensor. When light is transmitted to the optical sensor from the optical transmitter, a haze or smoke in air will attenuate the light. Accordingly, the transmissometer may calculate the visibility according to the degree of light attenuation. However, the transmissometer can only determine the visibility according to the concentration of haze or smoke. Therefore, if a main factor affecting the visibility is a fog, a sensed result of the traditional transmissometer will not be able to present a true ambient visibility.

SUMMARY OF THE INVENTION

The invention provides a visibility meter, a street light device and an operation method thereof, which may calculate a visibility according to a fog.

The visibility meter of the invention is configured to sense a fog to determine a visibility. The visibility meter includes a controller, an optical transmitter and an optical sensor. The optical transmitter is coupled to the controller. The optical transmitter is configured via the controller to transmit a visible laser. The optical sensor is coupled to the controller. The optical sensor receives the visible laser to generate a sensed result. The controller calculates the visibility according to the sensed result.

The invention further provides a street light device and an operation method thereof.

The street light device of the invention includes a light-emitting module, a driving circuit, and a visibility meter. The visibility meter includes an optical transmitter, an optical sensor, and a controller. The light-emitting module emits an illumination light. The driving circuit is coupled to the light-emitting module. The driving circuit is configured to drive the light-emitting module. The optical transmitter is configured to transmit a visible laser. The optical sensor is configured to receive the visible laser to generate a sensed result. The controller is coupled to the optical transmitter, the optical sensor, and the driving circuit. The controller calculates a visibility according to the sensed result, and configures the driving circuit according to the visibility to adjust a color temperature of the light-emitting module.

The operation method of the street light device of the invention includes the following steps. A visible laser is transmitted through an optical transmitter. The visible laser is received through an optical sensor to generate a sensed result. A fog-based visibility is calculated according to the sensed result.

Based on the foregoing, the visibility meter of the invention may calculate an ambient visibility by comparing the sensed result of the visible laser with a reference value. The street light device of the invention may automatically adjust the color temperature according to the visibility.

To make the features and advantages of the invention clear and easy to understand, the following gives a detailed description of embodiments with reference to accompanying drawings.

DESCRIPTION OF THE EMBODIMENTS

Figure 1:
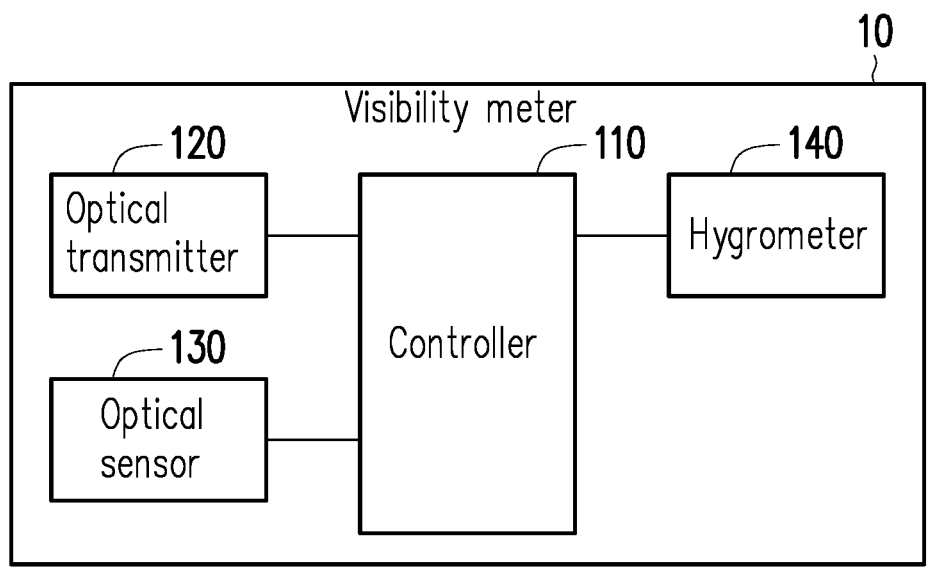
FIG. 1 is a functional circuit diagram of a visibility meter according to an embodiment of the invention.

To make the content of the invention more comprehensible, embodiments are described below as examples according to which the invention can indeed be implemented. Wherever possible, the same reference numbers are used in the drawings and the description to refer to the same or like parts, components or steps.

FIG. 1 is a functional circuit diagram of a visibility meter 10 according to an embodiment of the invention. The visibility meter 10 is, for example, a transmissometer. The visibility meter 10 is configured to sense a fog to determine a visibility. Referring to FIG. 1, the visibility meter 10 includes a controller 110, an optical transmitter 120, an optical sensor 130, and a hygrometer 140.

The controller 110 is, for example, a central processing unit (CPU), or other programmable general-purpose or special-purpose micro-control units (MCUs), microprocessors, digital signal processors or programmable controllers, other similar elements or a combination of the above elements.

The optical transmitter 120 is coupled to the controller 110, and is configured via the controller 110 to transmit a visible laser. The visible laser is, for example, a blue light laser, but the invention is not limited thereto. The optical sensor 130 is coupled to the controller 110, and receives the visible laser from the optical transmitter 120 to generate a sensed result corresponding to the visible laser. In addition, the optical sensor 130 may further receive an ambient light to calculate an ambient brightness. The optical sensor 130 is, for example, an RGB color sensor. The optical sensor 130 may use a blue channel of the RGB color sensor to measure the visible laser as the blue light laser to generate a corresponding sensed result. In addition, since a green light spectrum that can be sensed by a green channel of the RGB color sensor is closer to an ambient light source, the sensor 130 may use the green channel of the RGB color sensor to measure the ambient brightness.

In some embodiments, the optical sensor 130 further includes at least one of an infrared sensor and an ultraviolet sensor or a combination thereof. The infrared sensor or the ultraviolet sensor may assist the green channel of the RGB color sensor to measure the ambient brightness, so that the measured ambient brightness contains information of a wider spectrum.

The hygrometer 140 is coupled to the controller 110, and is configured to sense an ambient humidity. The controller 110 may determine, according to the ambient humidity, whether to activate the optical transmitter 120 (or the optical sensor 130). When the ambient humidity is low, the fog is not easy to produce, so that the measurement of the visibility is not necessary. Accordingly, the controller 110 may configure the optical transmitter 120 (or the optical sensor 130) to be turned off to save power. When the ambient humidity is high, the fog is easy to produce, so that the controller 110 may configure the optical transmitter 120 (or the optical sensor 130) to cause the optical transmitter 120 (or the optical sensor 130) to be activated according to the ambient humidity being higher than a humidity threshold. Therefore, the optical transmitter 120 (or the optical sensor 130) may transmit (or receive) the visible laser to measure the visibility.

Figure 2:
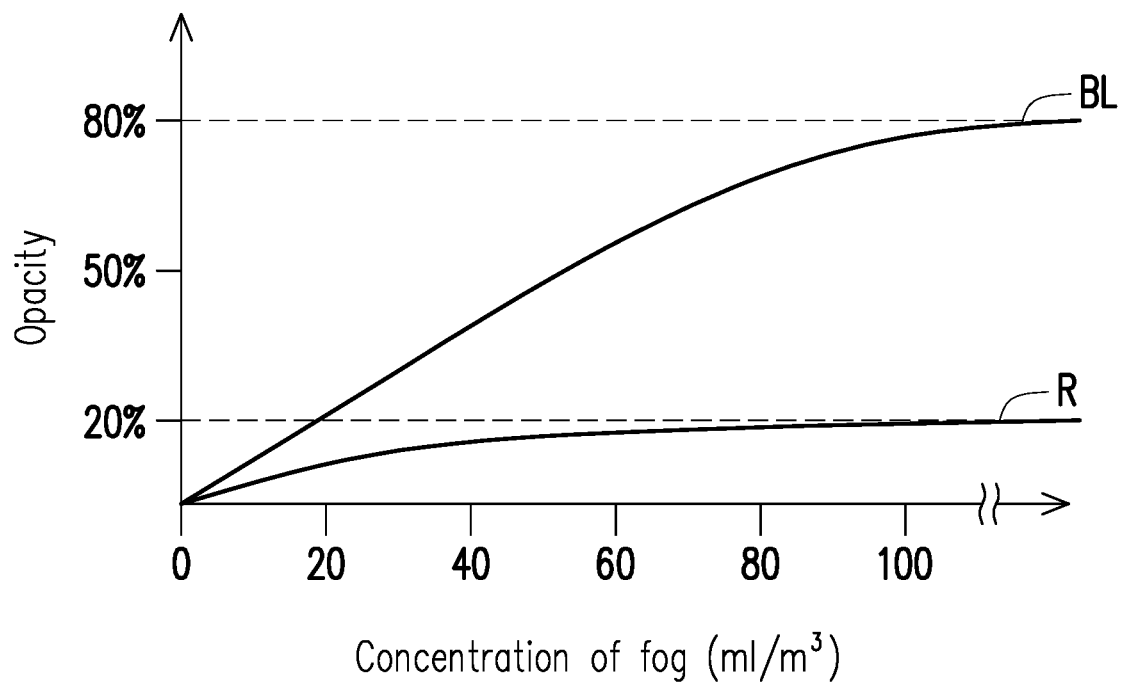
FIG. 2 is a schematic diagram of a sensitivity of a blue light laser to a fog according to an embodiment of the invention.

Compared to electromagnetic waves of other wavelengths, an opacity of a blue light laser with a wavelength in a range of 360 nm to 480 nm is most easily affected by the fog. When the concentration of the fog changes, the opacity of the blue light laser will change greatly. FIG. 2 is a schematic diagram of a sensitivity of a blue light laser to a fog according to an embodiment of the invention. In FIG. 2, a curve BL corresponds to the blue light laser, and a curve R corresponds to an infrared light. When the concentration of a fog changes, the degree of change of the curve BL is much higher than that of the curve R. In other words, the concentration change of the fog may be easily measured by observing the change in a sensed result of the blue light laser. If a path length of the blue light laser is too low, the sensed result of the blue light laser will not change significantly, so that it is difficult for the controller 110 to calculate the visibility according to the sensed result. Therefore, the path length of the blue light laser needs to be higher than a preset value. In an embodiment, a path length of a visible laser between the optical transmitter 120 and the optical sensor 130 is, for example, greater than or equal to 50 cm.

In the present embodiment, the controller 110 may calculate an opacity according to the sensed result generated from the optical sensor 130, so as to convert the opacity into the visibility. The opacity represents the degree of light not allowed to pass. As the opacity is higher, the visibility is lower. For example, if a path of the blue light laser between the optical transmitter 120 and the optical sensor 130 is filled with substances such as the fog, haze, smoke, or particulate matter (PM), the substances will attenuate the light. Accordingly, the opacity of the blue light laser will increase. The controller 110 determines that the visibility is low based on the high opacity.

Specifically, the controller 110 may calculate the opacity according to the sensed result and a reference value pre-stored in the controller 110. A calculation formula of the opacity is shown in the following formula (1):

$$S = \frac{IR - IM}{IR} \times 100\%. \qquad \text{Formula (1)}$$

S is the opacity, IR is a luminous intensity representing the reference value, and IM is a luminous intensity representing the sensed result.

In order to prevent the controller 110 from calculating an inaccurate opacity due to the fact that an external light source or dirt affects the sensed result of the blue light laser, the controller 110 may dynamically adjust the reference value according to an ambient change, so as to correct the opacity calculated based on the sensed result affected by an external factor. The reference value needs to be updated when the sensed result of the blue light laser is not affected by the external factor. In an embodiment, when the ambient humidity is low, it is represented that the sensed result of the blue light laser is less likely to be affected by the fog. Therefore, the controller 110 may update the foregoing reference value according to the ambient humidity being lower than a humidity threshold. In another embodiment, when the ambient brightness is low, it is represented that the sensed result of the blue light laser is less likely to be affected by an external light source. Therefore, the controller 110 may update the foregoing reference value according to the ambient brightness being lower than a brightness threshold.

Figure 3A:
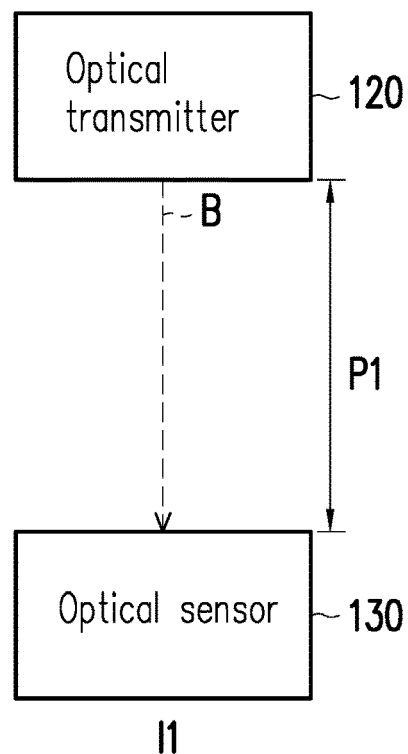
FIG. 3A is a schematic diagram of an optical transmitter and an optical sensor according to an embodiment of the invention.
Figure 3B:
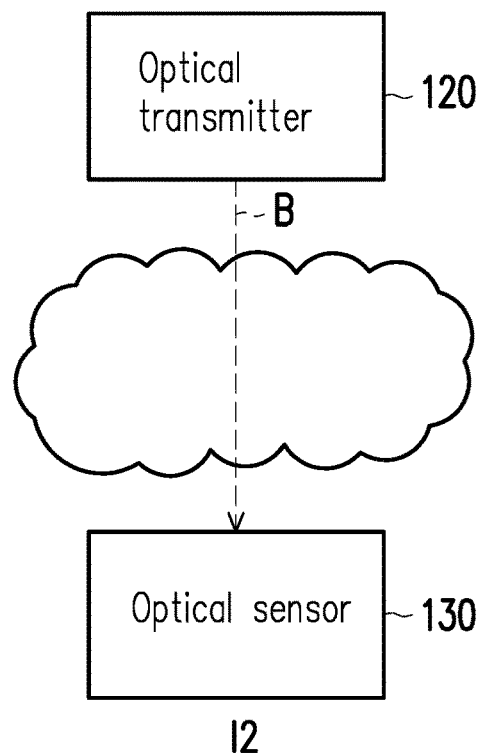
FIG. 3B is a schematic diagram of an optical transmitter and an optical sensor according to another embodiment of the invention.

FIG. 3A is a schematic diagram of an optical transmitter 120 and an optical sensor 130 according to an embodiment of the invention. A path length P1 of a visible laser B between the optical transmitter 120 and the optical sensor 130 is greater than or equal to 50 cm, but the invention is not limited thereto. Referring to FIG. 3A, after the controller 110 determines that there is no light source that affects a sensed result of a blue light laser according to an ambient brightness sensed by the optical sensor 130, and determines that an ambient humidity around a visibility meter 10 is low according to the ambient humidity sensed by a hygrometer 140, the controller 110 may configure the optical transmitter 120 to transmit the blue light laser (or visible laser) B and configure the optical sensor 130 to receive the blue light laser B. After the optical sensor 130 generates a luminous intensity I1 representing the sensed result in response to the received blue light laser B, the controller 110 may update the reference value IR as shown in Formula (1) to the luminous intensity I1. When the visibility meter 10 intends to measure the visibility, the controller 110 may calculate an opacity and a visibility corresponding to the opacity according to the updated reference value (that is, the luminous intensity I1). FIG. 3B is taken as an example. FIG. 3B is a schematic diagram of an optical transmitter 120 and an optical sensor 130 according to another embodiment of the invention. When a fog occurs between the optical transmitter 120 and the optical sensor 130, the optical sensor 130 may generate a luminous intensity I2 representing a sensed result in response to the received blue light laser B. Then, the controller 110 may calculate an opacity according to the sensed result (that is, the luminous intensity I2) and the updated reference value (that is, the luminous intensity I1), as shown in the following formula (2):

$$S = \frac{I1 - I2}{I1} \times 100\%. \qquad \text{Formula (2)}$$

S is the opacity, I1 is the luminous intensity representing the reference value, and I2 is the luminous intensity representing the sensed result.

Figure 4:
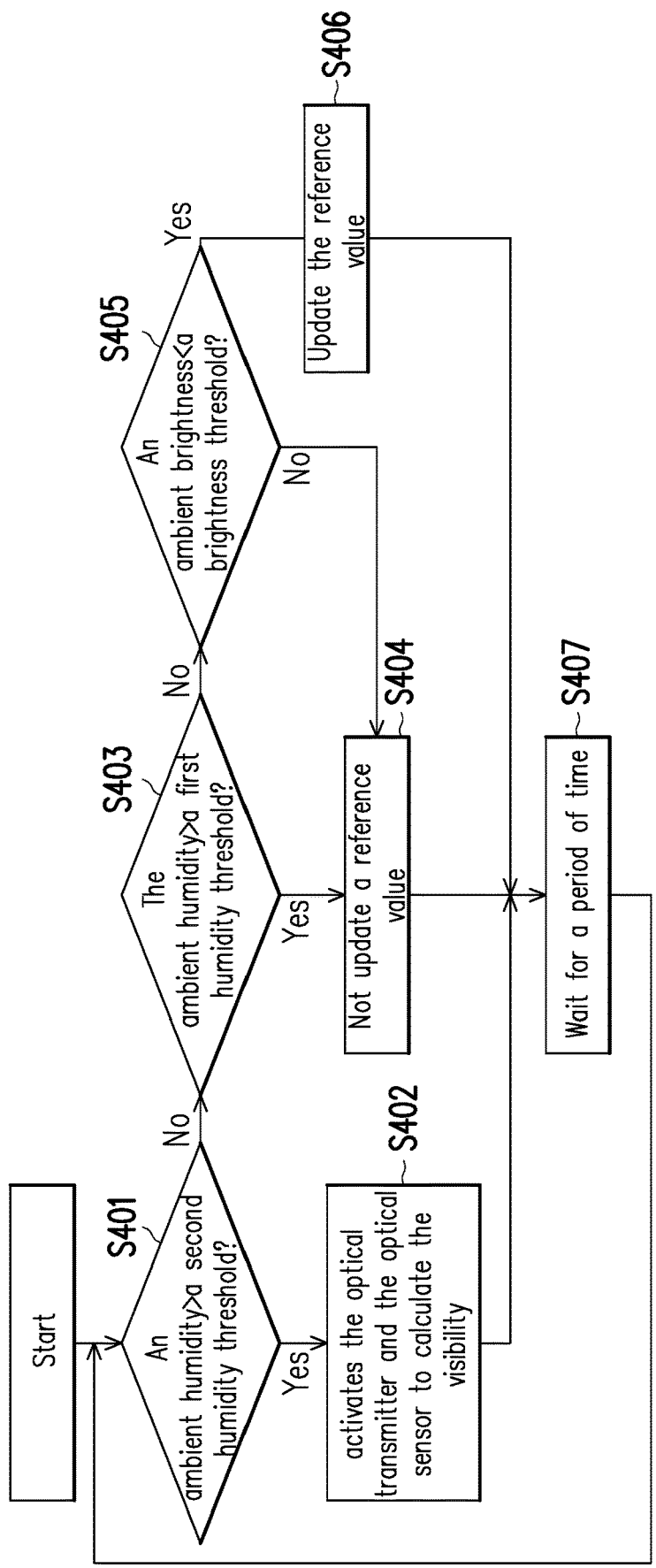
FIG. 4 is a flowchart of a fog-based visibility measurement method according to an embodiment of the invention.

FIG. 4 is a flowchart of a fog-based visibility measurement method according to an embodiment of the invention. The foregoing visibility measurement method may be implemented by the visibility meter 10 as shown in FIG. 1.

In step S401, the controller 110 determines whether an ambient humidity is higher than a second humidity threshold. If the ambient humidity is higher than the second humidity threshold, step S402 is performed. The second humidity threshold may be used as a reference for the controller 110 to determine whether to activate the optical transmitter 120 (or the optical sensor 130). If the ambient humidity is higher than the second humidity threshold, it is represented that a fog is likely to be produced in air, resulting in a reduced visibility. Therefore, in step S402, the controller 110 activates the optical transmitter 120 and the optical sensor 130 to calculate the visibility when the ambient humidity is higher than the second humidity threshold. On the other hand, if the ambient humidity is lower than or equal to the second humidity threshold, step S403 is performed. The second humidity threshold may be adjusted by a user of the visibility meter 10 according to the environment. For example, the second humidity threshold is, for example, 90%, but the invention is not limited thereto.

In step S403, the controller 110 determines whether the ambient humidity is higher than a first humidity threshold. If the ambient humidity is higher than the first humidity threshold, step S404 is performed. In step S404, the controller 110 does not update a reference value stored in the controller 110. If the ambient humidity is lower than or equal to the first humidity threshold, step S405 is performed. The first humidity threshold is used as a reference for the controller 110 to determine whether to update the reference value stored in the controller 110. If the ambient humidity is lower than or equal to the first humidity threshold, it is represented that a sensed result of a blue light laser is less likely to be affected by the fog. Therefore, when the ambient humidity is lower than or equal to the first humidity threshold, update of the reference value is preferred. The first humidity threshold may be adjusted by the user of the visibility meter 10 according to the environment. For example, the first humidity threshold is, for example, 70%, but the invention is not limited thereto. In an embodiment, the second humidity threshold is higher than the first humidity threshold, but the invention is not limited thereto.

In step S405, the controller 110 determines whether an ambient brightness is lower than a brightness threshold. If the ambient brightness is higher than or equal to the brightness threshold, step S404 is performed. If the ambient brightness is lower than the brightness threshold, step S406 is performed. In step S406, the controller 110 updates the reference value stored in the controller 110. When the ambient brightness is lower than the brightness threshold, it is represented that the sensed result of the blue light laser is less likely to be affected by an external light source. Therefore, when the ambient brightness is lower than the brightness threshold, update of the reference value is preferred. Specifically, the controller 110 may configure the optical transmitter 120 to transmit a blue light laser B and configure the optical sensor 130 to receive the blue light laser B. After the optical sensor 130 generates a luminous intensity I1 representing the sensed result in response to the received blue light laser B, the controller 110 may update the reference value IR as shown in Formula (1) to the luminous intensity I1.

After performing steps S402, S404, or step S406, in step S407, the visibility meter 10 waits for a period of time, and then the flow returns to step S401. If the user of the visibility meter 10 wants to update a color temperature of an illumination light of a light-emitting element at a higher frequency, the user may configure a short period of time. If a user of the visibility meter 10 wants to update the color temperature of the illumination light of the light-emitting element at a lower frequency to save power consumed by the visibility meter 10, the user may configure a long period of time.

Figure 5:
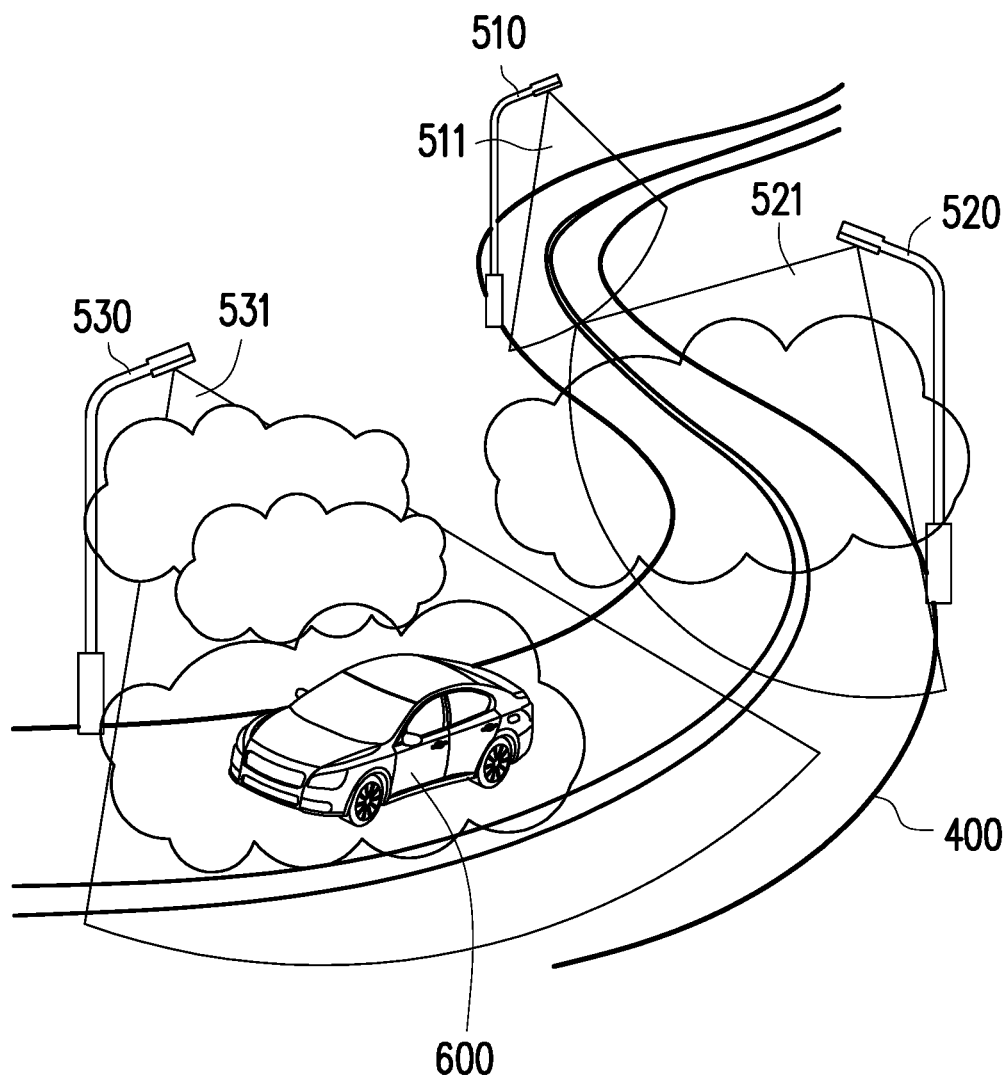
FIG. 5 is a schematic diagram of a street light system according to an embodiment of the invention.
Figure 7:
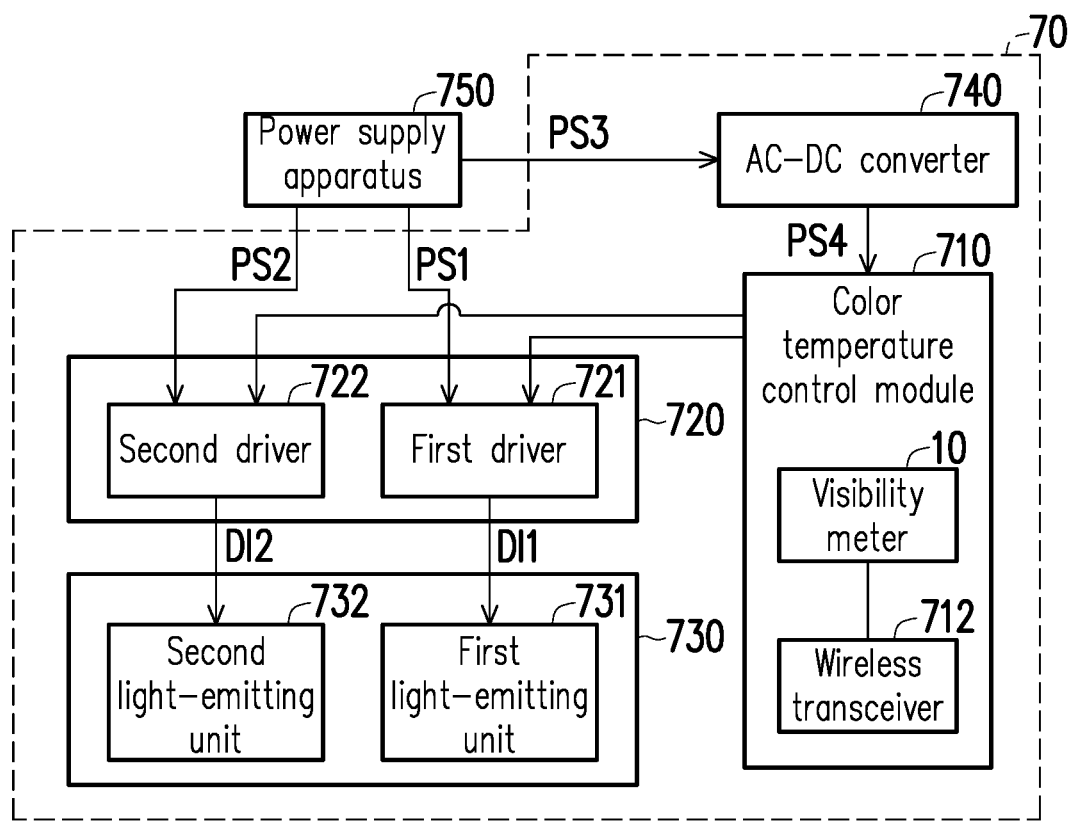
FIG. 7 is a functional block diagram of a street light device according to an embodiment of the invention.

FIG. 5 is a schematic diagram of a street light system according to an embodiment of the invention. A plurality of street light devices 510, 520, and 530 of FIG. 5 are sequentially disposed beside a road 400 to generate a plurality of illumination areas 511, 521, and 531, respectively. In an embodiment, the plurality of visibility meters 10 as shown in FIG. 1 may be installed on the street light devices 510, 520, and 530, respectively, so as to adjust color temperatures of the street light devices 510, 520, and 530 according to a visibility. The street light devices 510, 520, and 530 are, for example, a street light device 70 as shown in FIG. 7. For example, when a vehicle 600 travels through the illumination area 511, the visibility meter 10 (not shown in the figure) installed on the street light device 510 may automatically determine that the illumination area 511 is not fogged (high visibility). The street light device 510 provides a white light of 100% in response to the high visibility. The foregoing white light is, for example, an illumination light with a color temperature of 5000 K, but the invention is not limited thereto.

When the vehicle 600 travels through the illumination area 521, the visibility meter 10 (not shown in the figure) installed in the street light device 520 may automatically determine that the illumination area 521 is slightly fogged (slightly low visibility). The street light device 520 provides a yellow light of 50% and a white light of 50% in response to the slightly low visibility. The foregoing yellow light is, for example, an illumination light with a color temperature of 1700 K, but the invention is not limited thereto.

When the vehicle 600 travels through the illumination area 531, the visibility meter 10 (not shown in the figure) installed in the street light device 530 may automatically determine that the illumination area 531 is densely fogged (low visibility). The street light device 530 provides a yellow light of 100% in response to the low visibility.

Accordingly, in the present embodiment, the plurality of visibility meters 10 may be installed on the street light devices 510, 520, and 530, respectively. The visibility of the corresponding illumination areas is thus measured. Therefore, the street light devices 510, 520, and 530 of the present embodiment may automatically adjust the color temperature of the illumination light according to the visibility of the corresponding illumination areas effectively.

Figure 8:
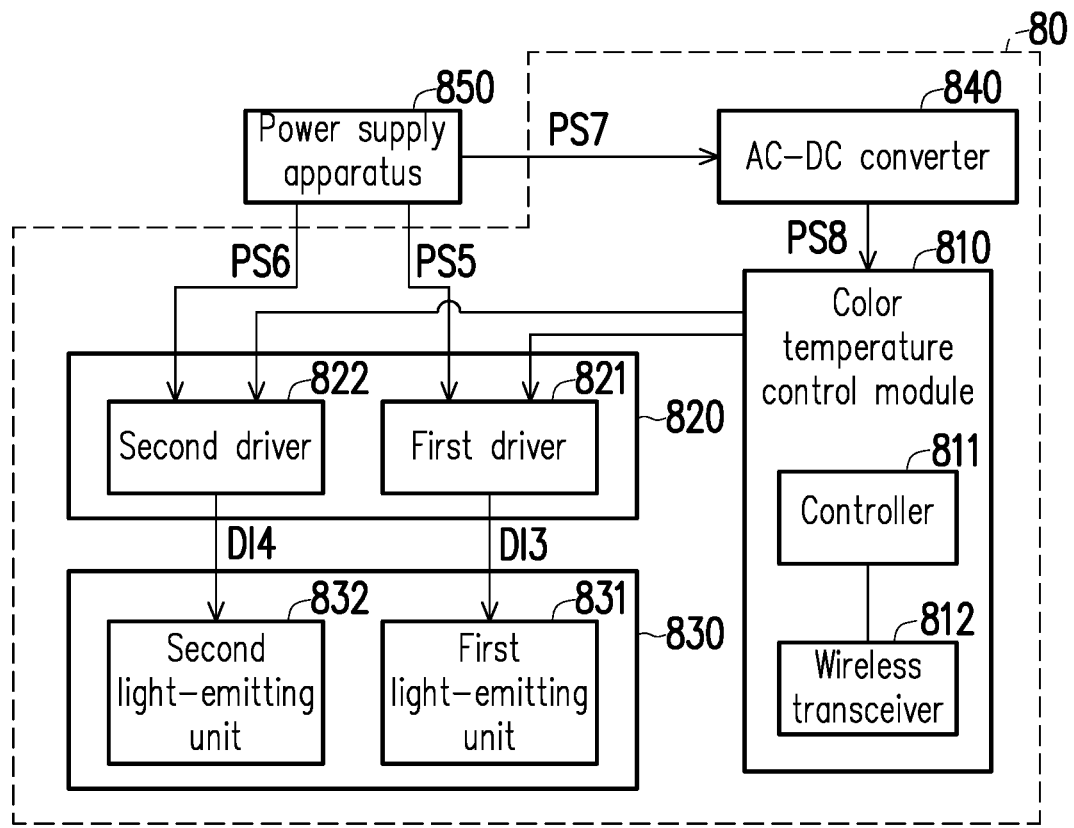
FIG. 8 is a functional block diagram of a street light device according to another embodiment of the invention.

In an embodiment, the street light device 510, 520 or 530 does not need to have the ability to measure the visibility, and may also adjust the color temperature of the illumination light according to the change in the visibility. For example, it is assumed that the street light device 510 is the street light device 70 as shown in FIG. 7 and the street light device 520 is a street light device 80 as shown in FIG. 8. After the street light device 510 with the visibility meter 10 measures the visibility, the street light device 510 may transmit a message including the visibility to the street light device 520. The street light device 520 may adjust the color temperature of the illumination light according to the visibility. In another embodiment, after the street light device 510 with the visibility meter 10 measures the visibility, the street light device 510 may transmit a color temperature configuration corresponding to the visibility to the street light device 520. The street light device 520 may adjust the color temperature of the illumination light according to the color temperature configuration.

Figure 6:
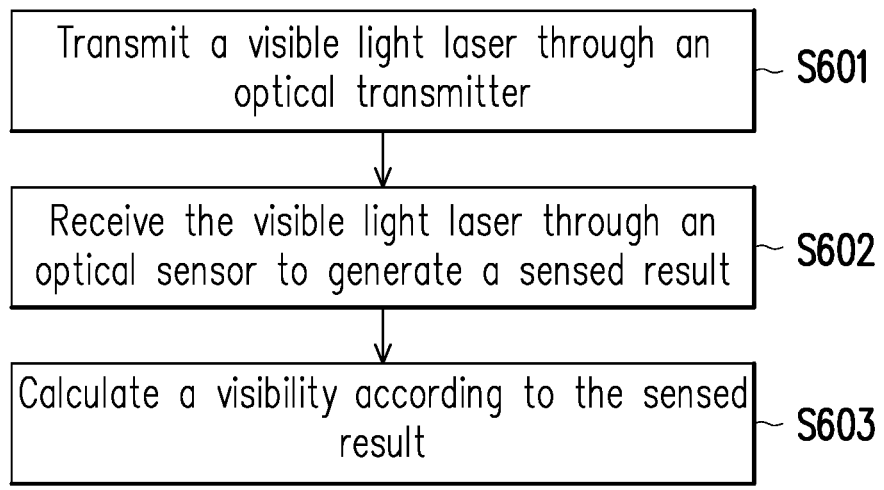
FIG. 6 is a flowchart of a fog-based visibility measurement method according to another embodiment of the invention.

FIG. 6 is a flowchart of a fog-based visibility measurement method according to another embodiment of the invention. The foregoing visibility measurement method may be implemented by the visibility meter 10 as shown in FIG. 1. In step S601, a visible laser is transmitted through the optical transmitter 120. In step S602, the visible laser is received through the optical sensor 130 to generate a sensed result. In step S603, a visibility is calculated according to the sensed result.

FIG. 7 is a functional block diagram of a street light device 70 according to an embodiment of the invention. The street light device 70 includes a color temperature control module 710, a driving circuit 720, a light-emitting module 730, and an AC-DC converter 740. The street light device 70 may be coupled to an external power supply apparatus 750, and the power supply apparatus 750 may be, for example, a mains supply. The color temperature control module 710 is coupled to the AC-DC converter 740 and includes the visibility meter 10 and a wireless transceiver 712 as shown in FIG. 1. The driving circuit 720 is coupled to the color temperature control module 710 (more specifically, the driving circuit 720 is coupled to the controller 110 in the visibility meter 10) and the power supply apparatus 750. The driving circuit 720 includes a first driver 721 and a second driver 722 respectively coupled to the controller 110. The light-emitting module 730 is coupled to the driving circuit 720 and includes a first light-emitting unit 731 and a second light-emitting unit 732. The first driver 721 is coupled to the first light-emitting unit 731 and drives the first light-emitting unit 731 to emit an illumination light. The second driver 722 is coupled to the second light-emitting unit 732 and drives the second light-emitting unit 732 to emit an illumination light. The power supply apparatus 750 provides AC power signals PS1 and PS2 to the first driver 721 and the second driver 722 respectively, and provides an AC power signal PS3 to the AC-DC converter 740. The AC-DC converter 740 converts the AC power signal PS3 into a DC power signal PS4, and provides the DC power signal PS4 to the color temperature control module 710.

Compared to an illumination light with a high color temperature (for example, a sunlight with a color temperature of 5000 K), an illumination light with a low color temperature (for example, a match light with a color temperature of 1700 K) has a better penetration. Therefore, in the case of low visibility, the driving circuit 720 may reduce a color temperature of the illumination light emitted by the light-emitting module 730, so that the illumination light can be more clearly seen. Specifically, the controller 110 of the visibility meter 10 may calculate a visibility, and configure the driving circuit 720 according to the visibility to adjust the color temperature of the illumination light emitted by the light-emitting module 730. The first light-emitting unit 731 of the light-emitting module 730 has a first color temperature and the second light-emitting unit 732 has a second color temperature. The first color temperature is lower than the second color temperature. The first color temperature is, for example, a match light of 1700 K, and the second color temperature is, for example, a sunlight of 5000 K, but the invention is not limited thereto. A driving current value DI1 for driving the first light-emitting unit 731 is inversely proportional to the visibility, and a driving current value DI2 for driving the second light-emitting unit 732 is directly proportional to the visibility. In other words, the driving circuit 720 increases the driving current value DI1 and decreases the driving current value DI2 based on the reduced visibility, so as to reduce the color temperature of the light-emitting module 730. On the other hand, the driving circuit 720 increases the color temperature of the light-emitting module 730 based on the increased visibility.

The wireless transceiver 712 transmits and receives a signal wirelessly. The wireless transceiver 712 may further perform operations such as low noise amplifying (LNA), impedance matching, frequency mixing, up-down conversion, filtering, and amplifying. The wireless transceiver 712 supports communication protocols including ZigBee, long range (LoRa), Bluetooth, or a low-power wide-area network (LPWA), but the invention is not limited thereto.

In the present embodiment, the wireless transceiver 712 is coupled to the controller 110 in the visibility meter 10. In an embodiment, the controller 110 may transmit a message including the visibility to an external electronic device through the wireless transceiver 712. In another embodiment, the controller 110 of the street light device 70 may transmit a color temperature configuration corresponding to the visibility to the external electronic device through the wireless transceiver 712. For example, the controller 110 of the street light device 70 may transmit the color temperature configuration including the visibility or corresponding to the visibility to the street light device 80 as shown in FIG. 8 through the wireless transceiver 712, so as to configure a color temperature of an illumination light emitted by the street light device 80.

FIG. 8 is a functional block diagram of a street light device 80 according to another embodiment of the invention. The difference between the street light device 80 and the street light device 70 shown in the previous embodiment is that a color temperature control module 810 of the street light device 80 does not include the visibility meter 10. The color temperature control module 810 of the street light device 80 of the present embodiment includes a controller 811 and a wireless transceiver 812. The controller 811 is coupled to the wireless transceiver 812 and receives a message from an external electronic device through the wireless transceiver 812. For example, the controller 811 may receive a message including the visibility or the color temperature configuration corresponding to the visibility from the street light device 70 through the wireless transceiver 812. Then, the controller 811 may configure a driving circuit 820 according to the visibility or the color temperature configuration to adjust a color temperature of a light-emitting module 830. A specific color temperature adjustment mode is the same as that of the street light device 70 shown in the previous embodiment, and will not be repeated here.

Figure 9:
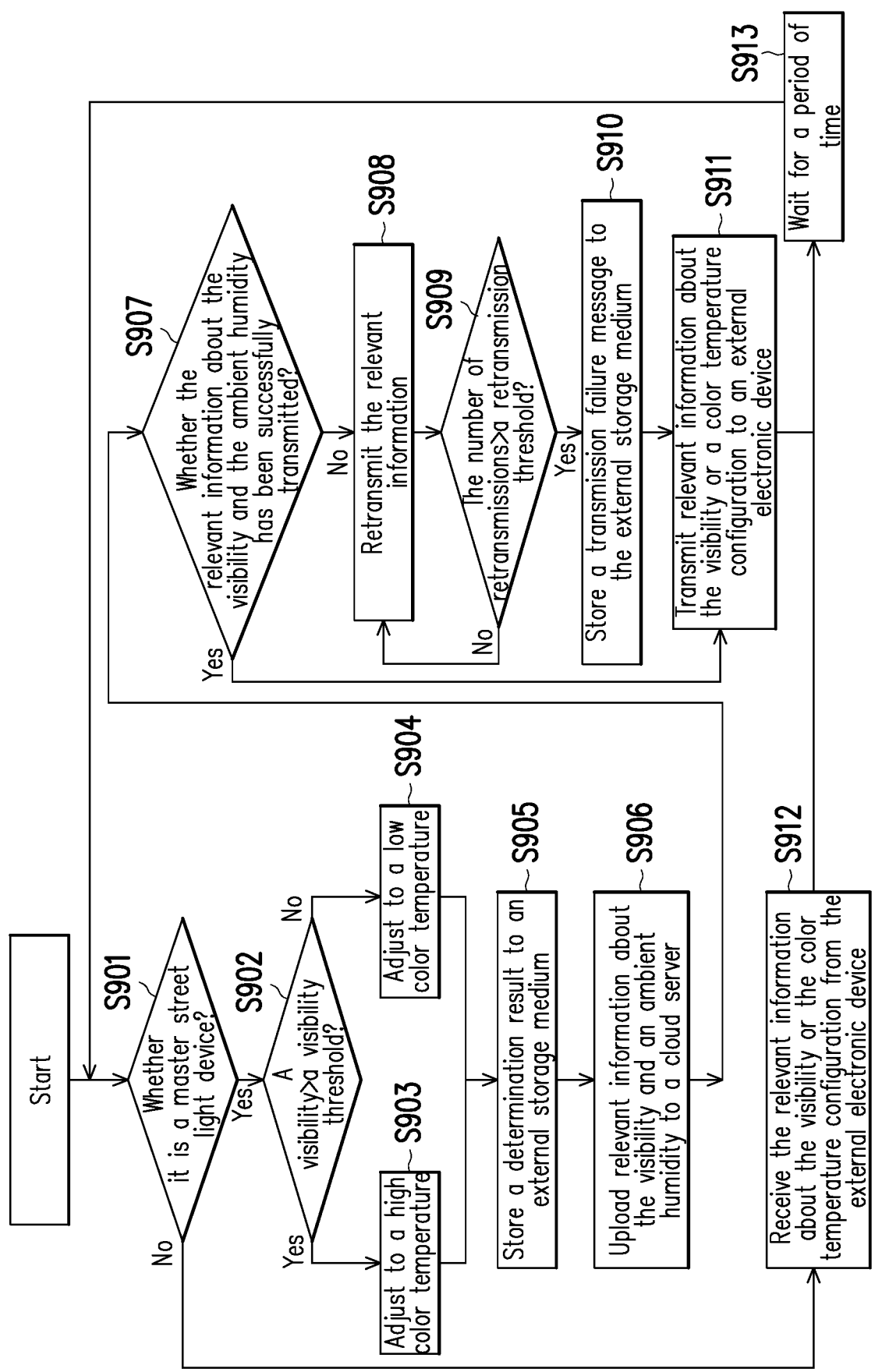
FIG. 9 is a flowchart of an operation method of a street light device according to an embodiment of the invention.

FIG. 9 is a flowchart of an operation method of a street light device according to an embodiment of the invention. The operation method may be implemented by the street light device 70 as shown in FIG. 7 or the street light device 80 as shown in FIG. 8. In the present embodiment, the street light device 70 having the visibility meter 10 serves as a master street light device. The street light device 70 may configure a color temperature of an illumination light emitted from the street light device 80 as a slave street light device according to the measured visibility. In step S901, a controller of a street light device determines whether the street light device is the master street light device. If the street light device is the master street light device, the flow proceeds to step S902. If the street light device is not the master street light device, the flow proceeds to step S912. In the present embodiment, the controller 110 of the street light device 70 may determine that the street light device 70 is the master street light device and then step S902 is performed. The controller 811 of the street light device 80 may determine that the street light device 80 is not the master street light device and then step S912 is performed. In step S912, the controller 811 of the street light device 80 receives relevant information about a visibility or a color temperature configuration corresponding to the visibility from an external electronic device (for example, the street light device 70) through the wireless transceiver 812. The controller 811 may adjust a color temperature of the street light device 80 according to the relevant information.

In step S902, the controller 110 of the street light device 70 determines whether the visibility is higher than a visibility threshold. Specifically, the visibility meter 10 of the street light device 70 can measure the visibility and an ambient humidity. The controller 110 may determine whether the visibility is higher than the visibility threshold according to the measured visibility. If the visibility is higher than the visibility threshold, step S903 is performed. If the visibility is lower than or equal to the visibility threshold, step S904 is performed. If the visibility is higher than the visibility threshold, it is represented that the visibility is good. Therefore, in step S903, the controller 110 configures the driving circuit 720 to adjust the illumination light emitted by the light-emitting module 730 to a high color temperature. On the other hand, if the visibility is lower than or equal to the visibility threshold, it is represented that the visibility is bad. Therefore, in step S904, the controller 110 configures the driving circuit 720 to adjust the illumination light emitted by the light-emitting module 730 to a low color temperature.

In step S905, the controller 110 stores a determination result generated in step S902 to an external storage medium. In step S906, the controller 110 uploads relevant information about the visibility and the ambient humidity measured by the visibility meter 10 to a cloud server through the wireless transceiver 712. In step S907, the controller 110 determines whether the relevant information about the visibility and the ambient humidity has been successfully transmitted. If the relevant information is successfully transmitted, the flow proceeds to step S911. In step S911, the controller 110 transmits the relevant information about the visibility or the color temperature configuration corresponding to the visibility to the external electronic device (for example, the street light device 80) through the wireless transceiver 712.

If the relevant information is unsuccessfully transmitted, the flow proceeds to step S908. In step S908, the controller 110 retransmits the relevant information about the visibility and the ambient humidity through the wireless transceiver 712. In step S909, the controller 110 determines whether the number of retransmissions of the relevant information is higher than a retransmission threshold. If the number of retransmissions is higher than the retransmission threshold, the flow proceeds to step S910. If the number of retransmissions is lower than or equal to the retransmission threshold, the flow proceeds to step S908. In step S910, the controller 110 stores a transmission failure message of the relevant information about the visibility and the ambient humidity to the external storage medium, and then the flow proceeds to step S911.

After step S911 or step S912 is performed, the street light device 70 or the street light device 80 waits for a period of time, and then the flow returns to step S901.

Figure 10:
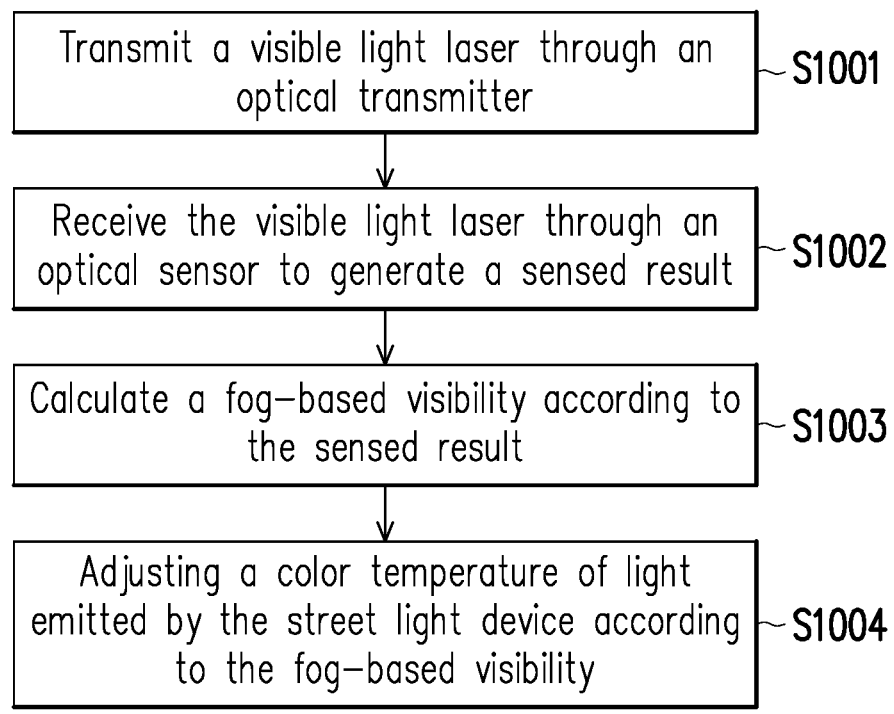
FIG. 10 is a flowchart of an operation method of a street light device according to another embodiment of the invention.

FIG. 10 is a flowchart of an operation method of a street light device according to another embodiment of the invention. The operation method may be implemented by the street light device 70 as shown in FIG. 7 or the street light device 80 as shown in FIG. 8. In step S1001, a visible laser is transmitted through an optical transmitter. In step S1002, the visible laser is received through an optical sensor to generate a sensed result. In step S1003, a fog-based visibility is calculated according to the sensed result. In an embodiment, the operation method further comprising step S1004. In step S1004, a color temperature of an illumination light of the street light device is adjusted according to the fog-based visibility.

As mentioned in the above embodiments, the path length P1 of the visible laser B between the optical transmitter 120 and the optical sensor 130 is greater than or equal to 50 cm. The structure of a visibility meter 10*a* will be specifically described below to further explain how a shape of an optical path of the visible laser B achieves the path length P1 that is greater than or equal to 50 cm.

Figure 11A:
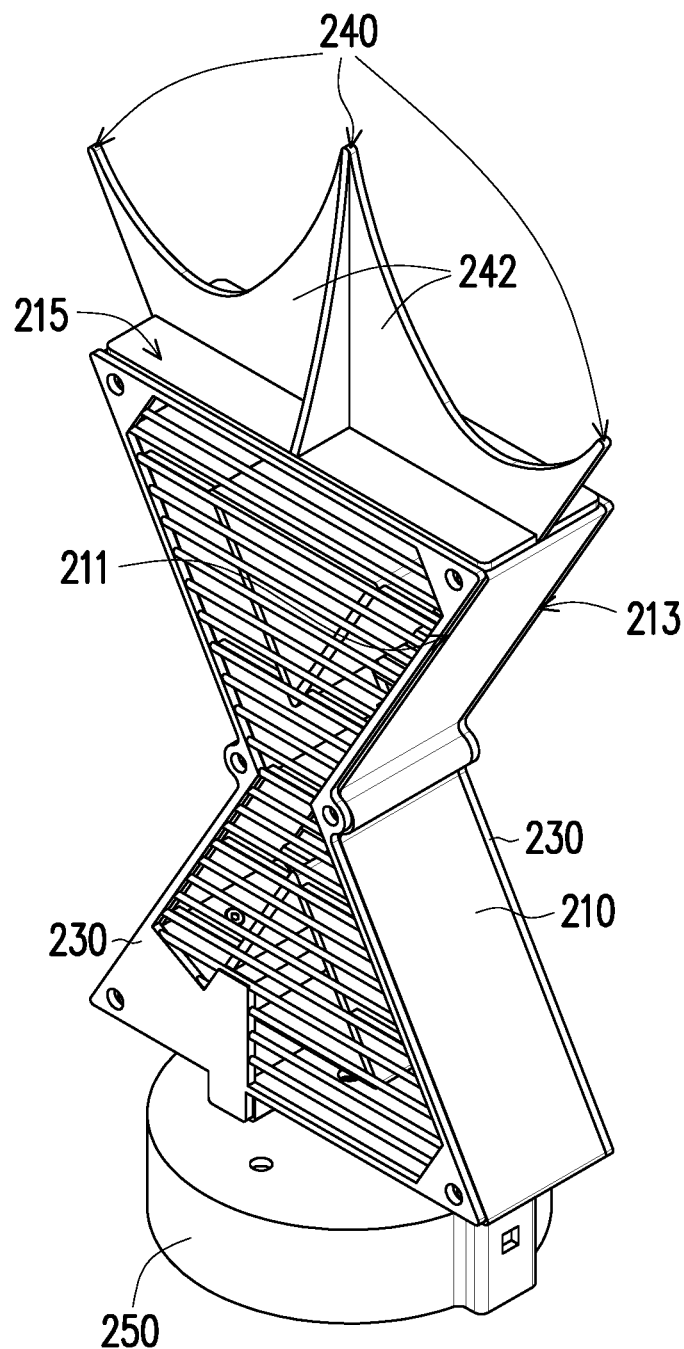
FIG. 11A is a three-dimensional view of a visibility meter according to an embodiment of the invention.
Figure 11B:
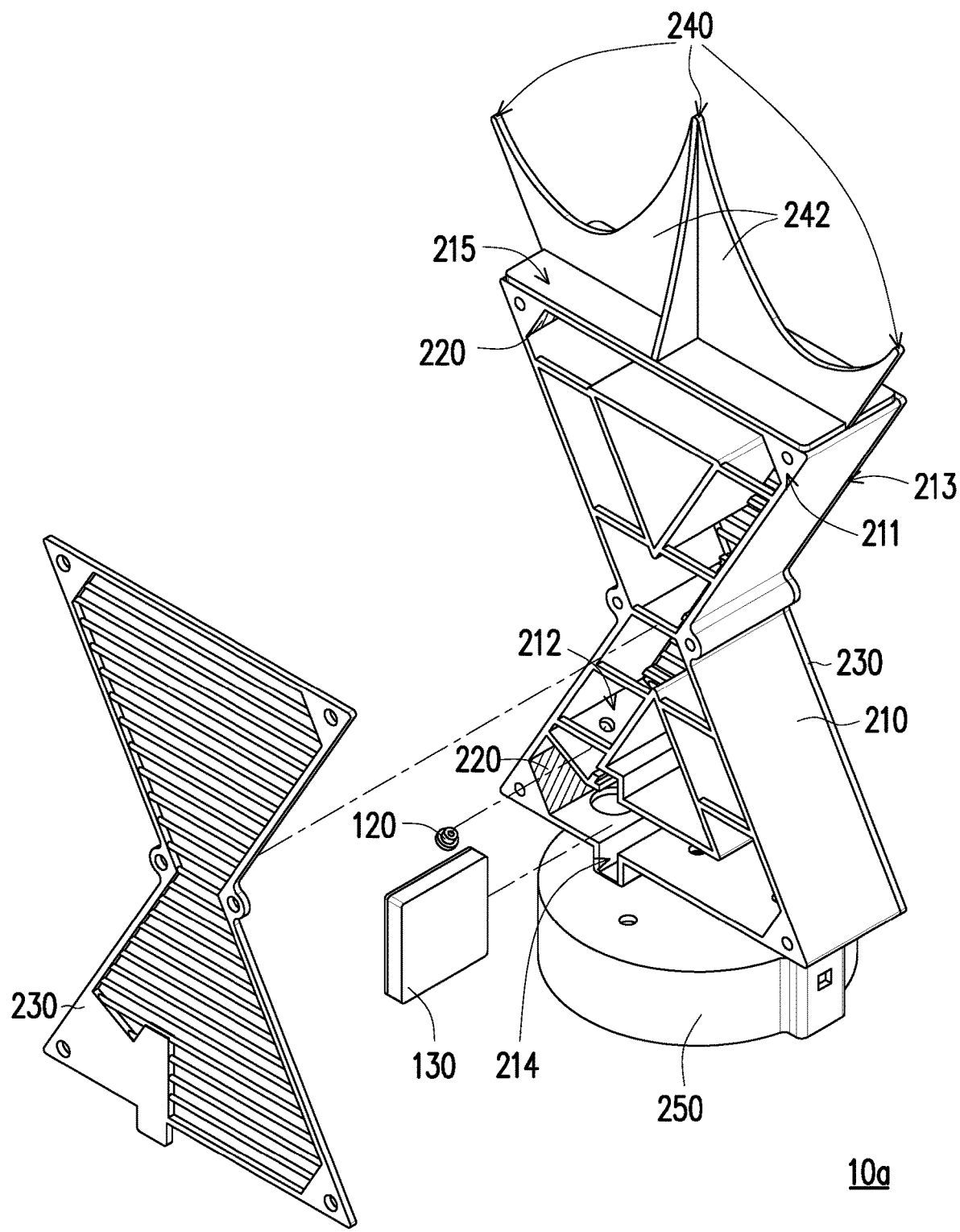
FIG. 11B is a three-dimensional exploded view of the visibility meter of FIG. 11A.

FIG. 11A is a three-dimensional view of a visibility meter according to an embodiment of the invention. FIG. 11B is a three-dimensional exploded view of the visibility meter of FIG. 11A. Referring to FIG. 11A and FIG. 11B at the same time, in the present embodiment, the visibility meter 10*a* includes a housing 210 and at least one optical path changing element (schematically depicted with a plurality of optical path changing elements 220) in addition to the controller 110, the optical transmitter 120, and the optical sensor 130 mentioned in FIG. 1. The optical transmitter 120 and the optical sensor 130 are disposed on the housing 210. The optical transmitter 120 is embedded on a platform 212 of the housing 210. The optical sensor 130 is inserted into a groove 214 of the housing 210. The optical path changing element 220 is disposed on the housing 210 to change a path of a visible laser. The shape of the housing 210 is embodied as an 8 shape here. The optical path changing elements 220 are disposed at four corners of the housing 210. The optical path changing element 220 is, for example, a reflector, a beam splitter, or a prism, but is not limited thereto. In other words, the shape of the optical path of the visible laser between the optical transmitter 120 and the optical sensor 130 in the present embodiment is an 8 shape.

Furthermore, the visibility meter 10*a* of the present embodiment further includes two protective covers 230 and an anti-bird pin 240. The protective covers 230 cover opposite side surfaces 211 and 213 of the housing 210. The optical transmitter 120, the optical sensor 130, the housing 210, and the optical path changing elements 220 are located between the protective covers 230. The anti-bird pin 240 is disposed on an upper surface 215 of the housing 210 to prevent birds from staying on the visibility meter 10a and affecting a sensing structure. As shown in FIG. 11A and FIG. 11B, the anti-bird pin 240 is connected by a connecting portion 242, which may increase the structural strength of plastics.

In addition, the visibility meter 10a of the present embodiment further includes an assembly base 250, which is disposed below the housing 210 and may be configured to be assembled with a socket (not shown) of a smart street light (not shown). Of course, the visibility meter 10a of the present embodiment may also be assembled with a general street light (such as the street light device 510, 520, or 530 of FIG. 5) by pasting. Since the visibility meter 10a of the present embodiment may be directly installed on the socket of the smart street light, a color temperature of the street light may be adjusted in real time according to the measured visibility. The advantages of convenient assembly and man-hour and labor saving are realized.

In short, since the shape of the optical path of the visible laser between the optical transmitter 120 and the optical sensor 130 in the present embodiment is embodied as the 8 shape and the path length is greater than or equal to 50 cm, the reliability may be effectively improved. The optical path changing elements 220 are disposed to change an optical path direction of the visible laser, a folded visible light transmission path is used to reduce the volume of the visibility meter 10a, and a measurement distance may be increased without making the visibility meter 10a too large in size.

Figure 12A:
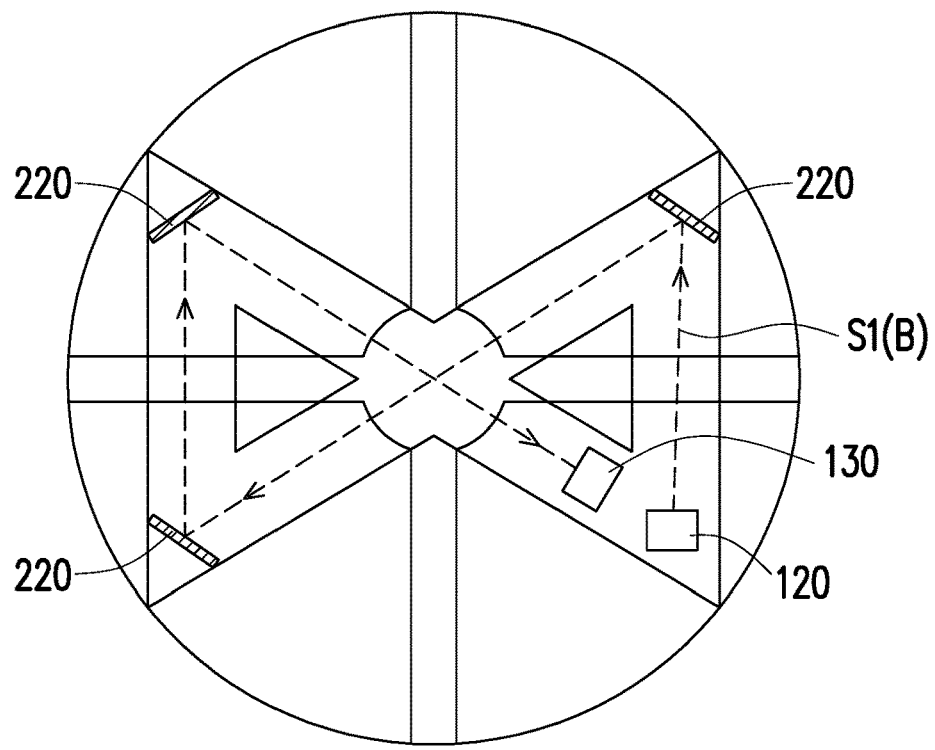
FIG. 12A to FIG. 12D are schematic diagrams of a shape of an optical path of a visible laser between an optical transmitter and an optical sensor according to a plurality of embodiments of the invention.
Figure 12B:
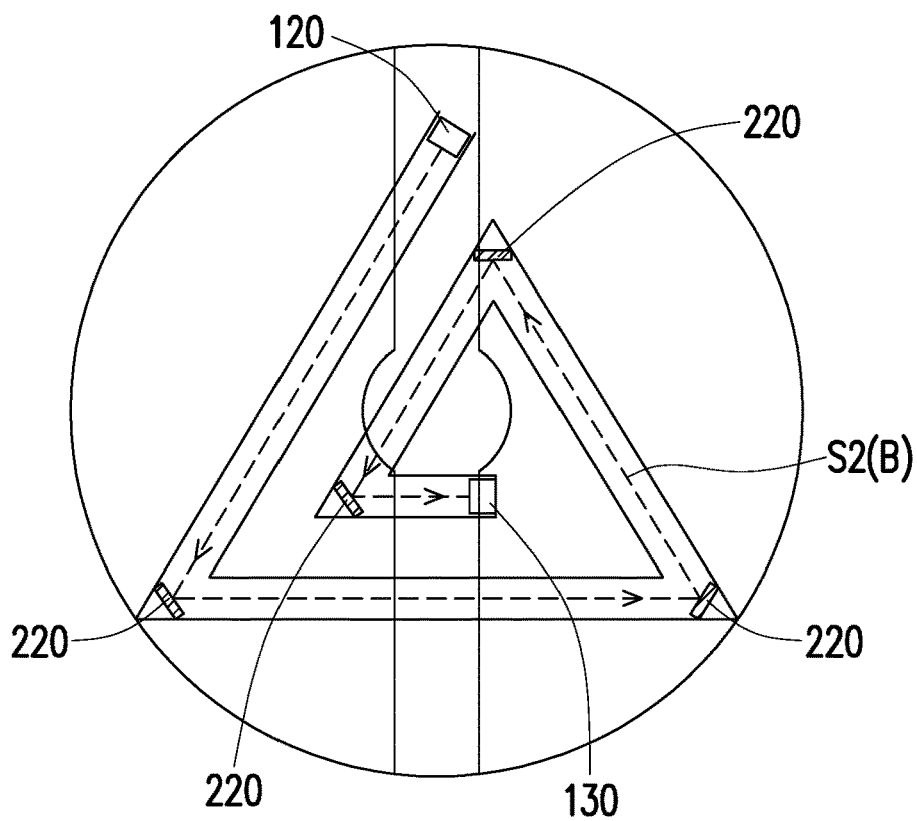
Figure 12C:
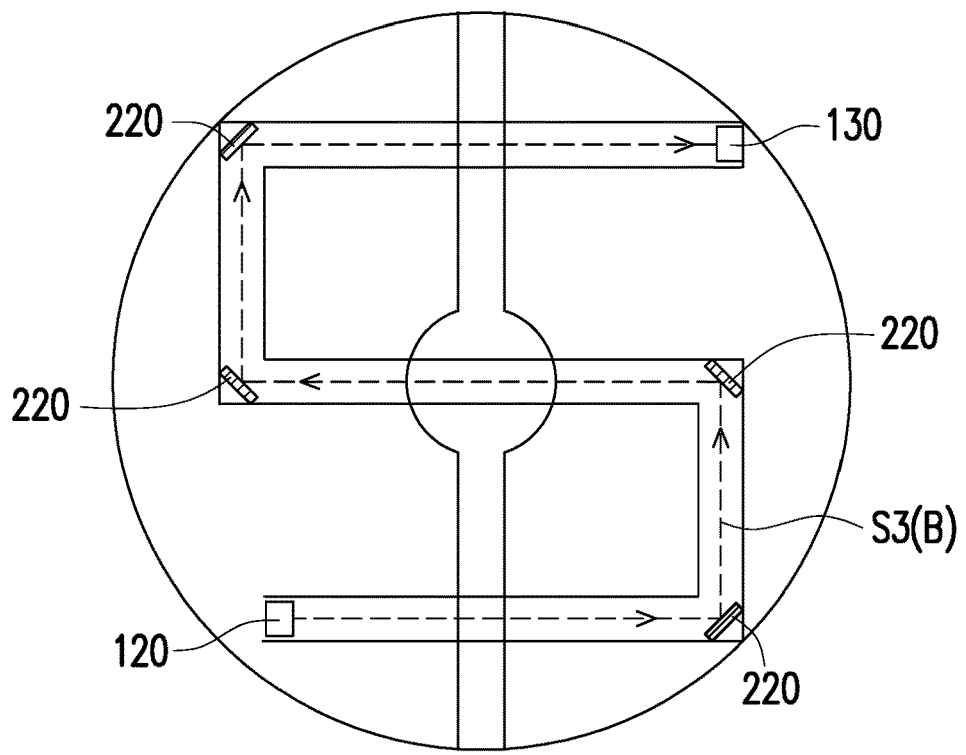
Figure 12D:
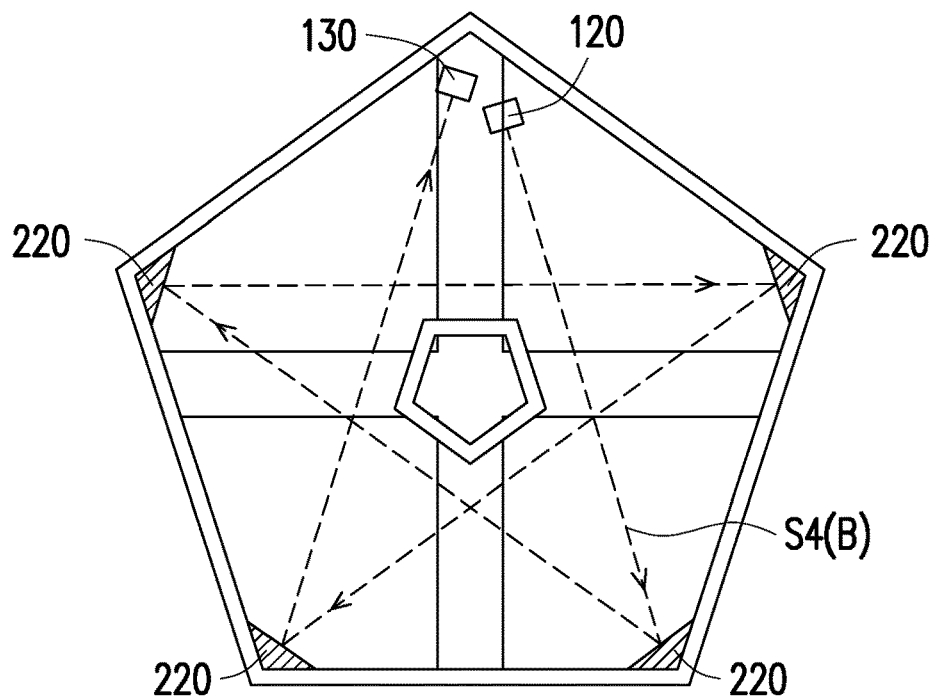

Of course, the invention is not limited to the above 8-shaped optical path. In other embodiments, referring to FIG. 12A, a shape of an optical path S1 of the visible laser B between the optical transmitter 120 and the optical sensor 130 in the present embodiment is embodied as a bow-tie shape; or, referring to FIG. 12B, a shape of an optical path S2 of the visible laser B between the optical transmitter 120 and the optical sensor 130 in the present embodiment is embodied as a triangle-like shape; or, referring to FIG. 12C, a shape of an optical path S3 of the visible laser B between the optical transmitter 120 and the optical sensor 130 in the present embodiment is embodied as an S shape; or, referring to FIG. 12D, a shape of an optical path S4 of the visible laser B between the optical transmitter 120 and the optical sensor 130 in the present embodiment is embodied as a pentagram shape. That is to say, the path length of the visible laser B between the optical transmitter 120 and the optical sensor 130 is a measurement distance that is greater than or equal to 50 cm on a horizontal plane, but the present embodiment is not limited thereto.

In an embodiment not shown, the visibility meter may also have a structural design that is placed flatwise on the street light device, as long as the measurement distance of the path length of the visible laser between the optical transmitter and the optical sensor on the horizontal plane is greater than or equal to 50 cm by the optical path changing element. The detection accuracy of the visibility meter may be improved.

Based on the foregoing, the visibility meter of the invention uses the blue light laser to sense the fog to calculate the ambient visibility, and the color temperature of the illumination light of the light-emitting element is adjusted according to the visibility, so that even if the light-emitting element is in a low-visibility environment, the generated illumination light can be clearly seen by a person. In addition, the visibility meter of the invention calculates the visibility by comparing the sensed result with the reference value. The reference value may be dynamically updated. Therefore, even if the external light source or dirt affects the sensed result of the blue light laser, the visibility meter of the invention may accurately calculate the visibility based on the updated reference value. On the other hand, the street light device of the invention may automatically adjust the color temperature according to the visibility. The street light device capable of measuring the visibility may be provided with the wireless transceiver, and the measured visibility or the color temperature configuration corresponding to the visibility is transmitted to other street lights through the wireless transceiver.

Components, actions or instructions used in the detailed descriptions of the disclosed embodiments of the invention should not be construed as being absolutely critical or necessary to the invention unless explicitly described as such. Moreover, as used herein, the indefinite article "a/an" may include more than one item. To refer to only one item, the term "single" or a similar phrase may be used. In addition, as used herein, the term "any of" before a list of a plurality of items and/or a plurality of item categories is intended to include the item and/or the item category individually or in combination with "any of", "any combination of", "any plurality of" and/or "any combination of a plurality of" other items and/or other item categories. In addition, as used herein, the term "collection" is intended to include any quantity of items, including zero. In addition, as used herein, the term "quantity" is intended to include any quantity, including zero.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A visibility meter, configured to sense a fog to determine a visibility, the visibility meter comprising:
    a controller;
    an optical transmitter, coupled to the controller, the optical transmitter being configured to transmit a visible laser;
    an optical sensor, coupled to the controller, the optical sensor receiving the visible laser to generate a sensed result; and
    a hygrometer, coupled to the controller and configured to sense an ambient humidity, wherein
    the controller calculates the visibility according to the sensed result and a reference value of a luminous intensity, wherein
    the controller updates the reference value according to the ambient humidity being lower than a first humidity threshold.

2. The visibility meter according to claim 1, wherein the visible laser is a blue light laser.

3. The visibility meter according to claim 1, wherein the optical transmitter is activated according to the ambient humidity being higher than a second humidity threshold, so as to transmit the visible laser.

4. The visibility meter according to claim 1, wherein the optical sensor receives an ambient light to calculate an ambient brightness, and the controller updates the reference value according to the ambient brightness being lower than a brightness threshold.

5. The visibility meter according to claim 1, wherein a path length of the visible laser between the optical transmitter and the optical sensor is greater than or equal to 50 cm.

6. The visibility meter according to claim 5, wherein a shape of an optical path of the visible laser between the optical transmitter and the optical sensor comprises an 8 shape, a bow-tie shape, a triangle-like shape, an S shape, or a pentagram shape.

7. The visibility meter according to claim 5, further comprising:
- a housing, the optical transmitter and the optical sensor being disposed on the housing; and
- at least one optical path changing element, disposed on the housing to change a path of the visible laser between the optical transmitter and the optical sensor.

8. A street light device, comprising:
- an illumination light source;
- a driving circuit, coupled to the illumination light source, wherein the driving circuit is configured to drive the illumination light source; and
- a visibility meter, comprising:
  - an optical transmitter, configured to transmit a visible laser;
  - an optical sensor, configured to receive the visible laser to generate a sensed result;
  - a hygrometer, configured to sense an ambient humidity; and
  - a controller, coupled to the optical transmitter, the optical sensor, the hygrometer, and the driving circuit, wherein the controller calculates a visibility according to the sensed result and a reference value of a luminous intensity, configures the driving circuit according to the visibility to adjust a color temperature of the illumination light source, and updates the reference value according to the ambient humidity being lower than a first humidity threshold.

9. The street light device according to claim 8, wherein the illumination light source comprises a first light source and a second light source, wherein the first light source emits light with a first color temperature, the second light source emits light with a second color temperature, and the first color temperature is lower than the second color temperature.

10. The street light device according to claim 9, wherein a first driving current value of the first light source is inversely proportional to the visibility, and a second driving current value of the second light source is directly proportional to the visibility.

11. The street light device according to claim 8, further comprising:
- a wireless transceiver, coupled to the controller, wherein the controller transmits a message comprising the visibility or a color temperature configuration corresponding to the visibility to an external electronic device through the wireless transceiver.

12. An operation method of a street light device, comprising:
- transmitting a visible laser through an optical transmitter;
- receiving the visible laser through an optical sensor to generate a sensed result
- sensing an ambient humidity through a hygrometer;
- calculating a fog-based visibility according to the sensed result and a reference value of a luminous intensity; and
- updating the reference value according to the ambient humidity being lower than a first humidity threshold.

13. The operation method of the street light device according to claim 12, further comprising:
- adjusting a color temperature of light emitted by the street light device according to the fog-based visibility.

* * * * *